United States Patent [19]

Klosk

[11] Patent Number: 4,551,049
[45] Date of Patent: Nov. 5, 1985

[54] APPARATUS FOR TRANSPORTING WHEEL AND AXLE ASSEMBLIES

[76] Inventor: Lawrence Klosk, 3977 Sedgwick Ave., Bronx, N.Y. 10463

[21] Appl. No.: 442,909

[22] Filed: Nov. 19, 1982

[51] Int. Cl.[4] ............................................... B60P 7/12
[52] U.S. Cl. ........................................ 410/42; 410/49
[58] Field of Search .................. 410/31, 32, 42, 43, 410/47, 48, 49, 2; 414/786

[56] References Cited

U.S. PATENT DOCUMENTS

| | | | |
|---|---|---|---|
| 1,643,544 | 9/1927 | Cushnyr | 410/49 X |
| 1,735,800 | 11/1929 | Snyder | 410/43 |
| 2,810,602 | 10/1957 | Abrams | 410/42 |
| 3,829,148 | 8/1974 | Stoneburner | 410/49 |
| 4,175,666 | 11/1979 | Smith | 410/42 X |

Primary Examiner—Robert B. Reeves
Assistant Examiner—Glenn B. Foster
Attorney, Agent, or Firm—James & Franklin

[57] ABSTRACT

Three flatbed trailer trucks are provided with subway wheel and axle assembly receiving racks. The racks include parts fastened at locations spaced to receive the wheel flanges therebetween. Each part includes upstanding elements cooperating to form a semicircular recess to receive a wheel and a rigidity enhancing member extending perpendicular to the plane of the elements. The driver transports an unloaded trailer from the yard to a first location where the assemblies are removed from the train. The driver picks up a loaded trailer, previously situated at that location, which is transported to the repair location. At the repair location, he/she picks up a trailer previously situated at the repair location, which is loaded with repaired assemblies and returns to the first location where the truck is unloaded and the repair wheels are reinstalled. He/she then returns to the yard with an unloaded trailer which is ready for the next day's route.

4 Claims, 4 Drawing Figures

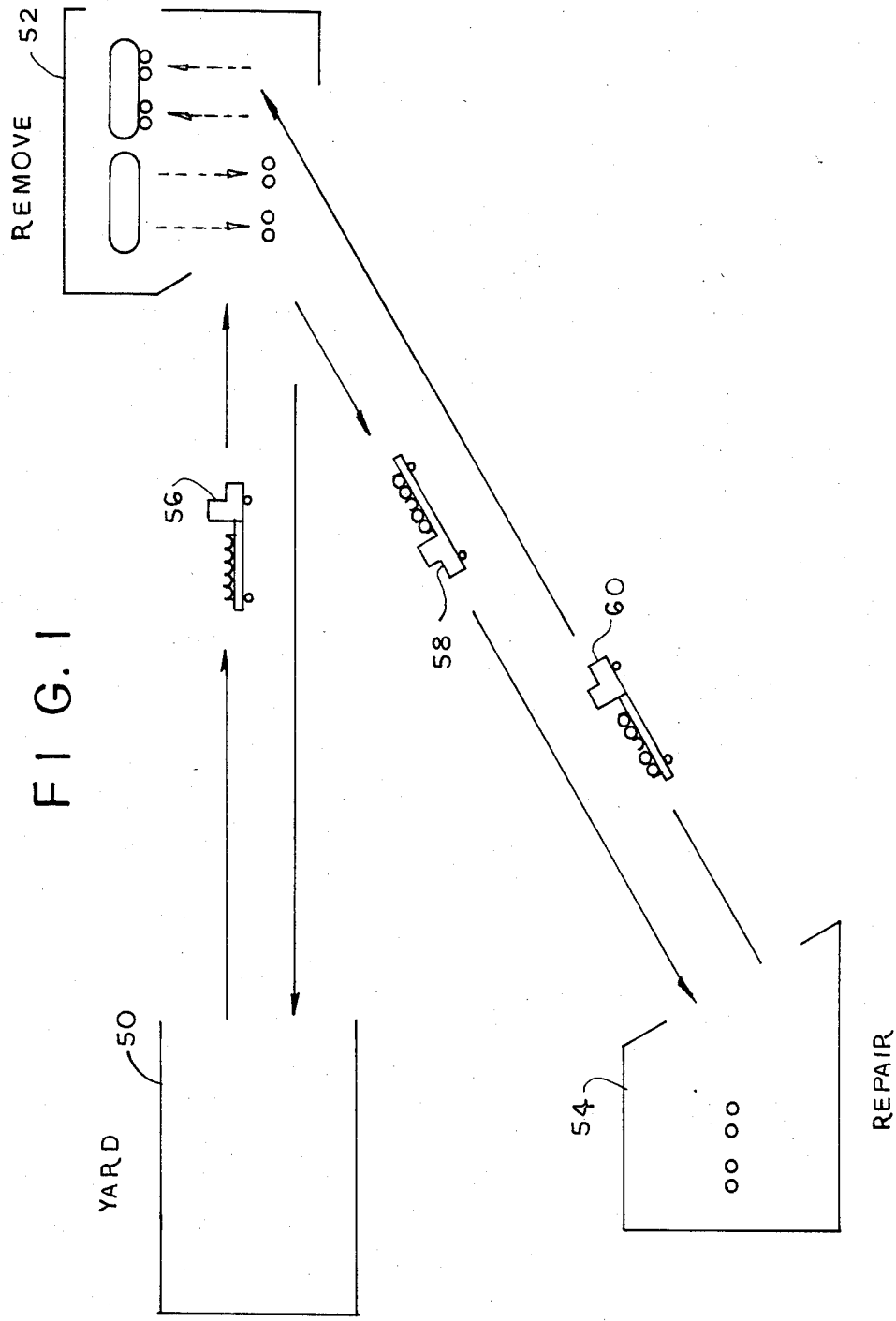

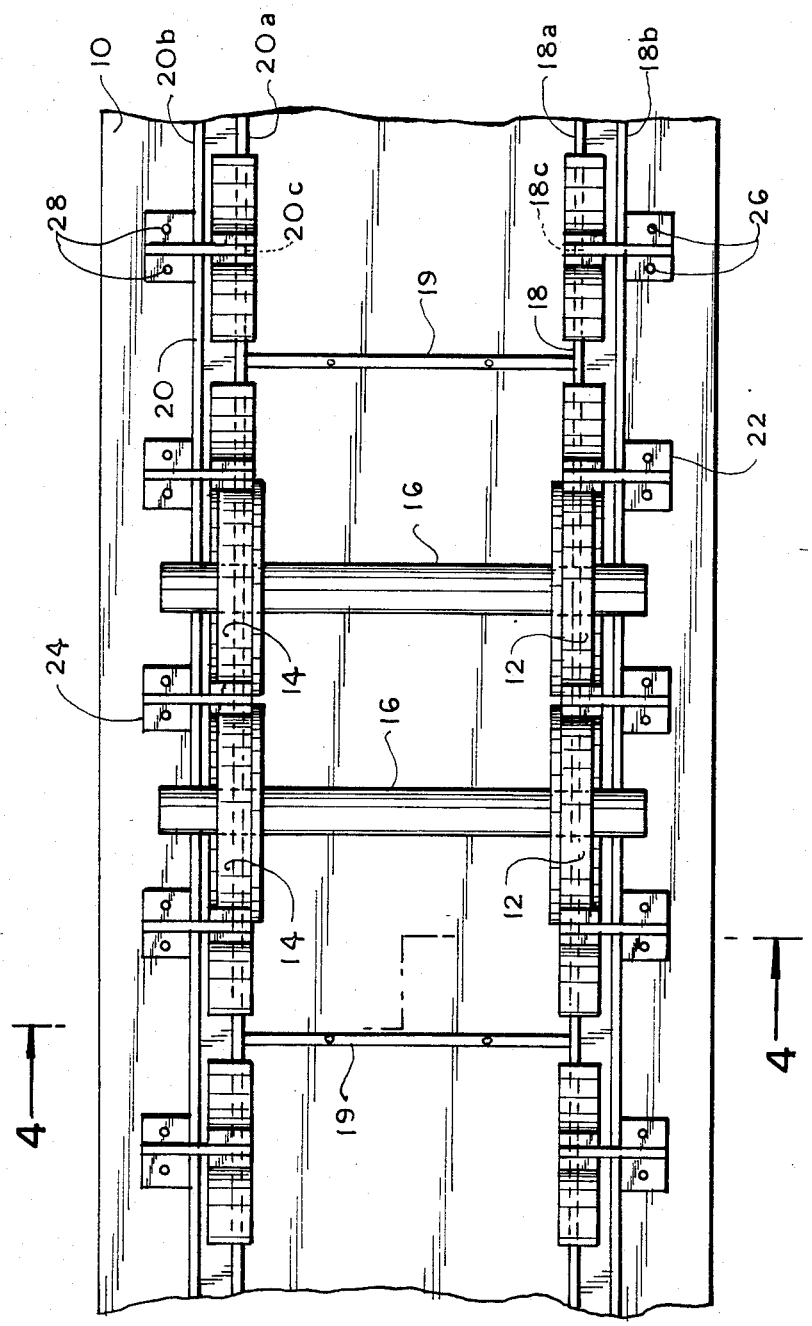

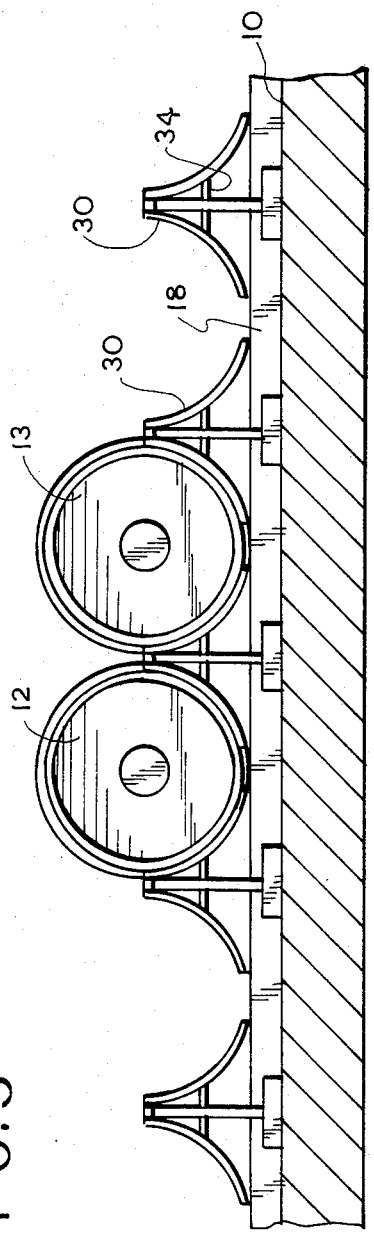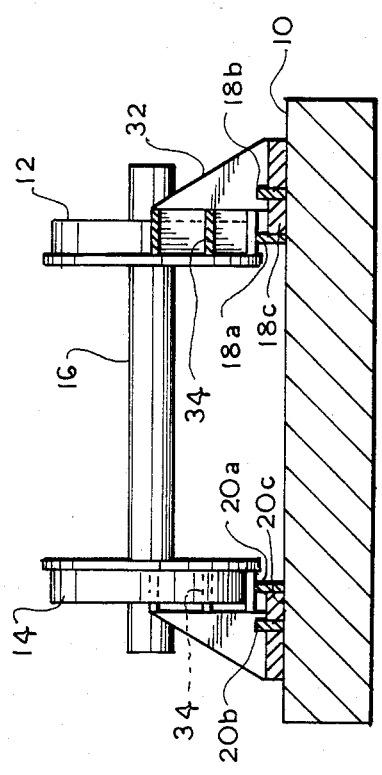

APPARATUS FOR TRANSPORTING WHEEL AND AXLE ASSEMBLIES

The present invention relates to the repair of railroad passenger car wheel and axle assemblies and, more particularly, to an apparatus for transporting wheel and axle assemblies between remote repair locations employing three vehicles specifically adapted for this purpose which are located and transported in a manner which reduces labor, as well as cost.

Passenger train cars, such as the subway cars used by many metropolitan subway systems, move on sets of wheel and axle assemblies which periodically require repair. For example, the wheels require periodic grinding in a wheel truing machine, to insure proper functioning. Often, the facility having the capability to remove and reinstall the wheel and axle assemblies from the undertruck of the subway cars is situated at a location remote from the repair shop where the wheels are ground. Thus, once the assemblies are removed from the undertruck of the subway car at the first location, the assemblies must be transported to the remote repair shop. After repair, the assemblies must be transported back to the first location where the repaired assemblies are reinstalled.

In the past, transportation of the assemblies from the first location where they are removed, to the shop where they are repaired and back again was done by rail. The wheel and axle assemblies were loaded onto and chained to a flatbed railroad car which was pulled between locations by a diesel engine. The diesel engine required an engineer and a conductor to operate safely. Accordingly, transportation of the wheel and axle assemblies for repair required at least two individuals, a diesel engine, and a flatbed railroad car.

For example, the New York City Transit Authority maintains a location at 207th Street and Tenth Avenue in Manhattan, N.Y. which has facility to remove and reinstall wheel and axle assemblies to the undertruck of subway cars. However, the repair shop where the wheel truing machine is located is situated in Coney Island, Brooklyn, N.Y., a long distance from the assembly removal and installation location.

In order to transport the wheel and axle assemblies between the removal facility and the repair shop, a work train consisting of a diesel engine pulling a flatbed railroad car is employed. However, such work trains cannot be scheduled for daytime movement because this would interfere with normal passenger train traffic. Thus, the work train can travel only at night when passenger train traffic is at a minimum.

These scheduling difficulties result in delays and limitations on productivity. For example, if the work train is loaded during a first day with assemblies at the removal location, the loaded train must wait until night to travel to the repair shop. On the second day, the assemblies would be unloaded at the repair shop. On the third day, the unloaded assemblies would be repaired and reloaded onto the work train, which would travel back to the removal location during the night of the third day. On the fourth day, the repaired assemblies would be unloaded from the truck. On the fifth day, the repaired assemblies would be reinstalled on the passenger trains.

Not only does the cycle require five days to complete, this method of transport causes some workers to be idle at certain times because they are awaiting a work train which can travel only at night. Other workers may have to rush to complete the day's activities so that the work train is ready to travel at night. Accordingly, some operations are delayed while others may be rushed, simply because of the restrictions in work train transit schedules.

Moreover, because wheel and axle assemblies roll easily on a flat surface, loading the assemblies onto a flatbed railroad car and securing the assemblies to the car to prevent movement thereof during transit is a difficult, time consuming, and sometimes dangerous activity.

It is, therefore, a prime object of the present invention to provide method and apparatus for transporting wheel and axle assemblies which reduces delays due to restrictions in work train transit scheduling.

It is another object of the present invention to provide a method and apparatus for transporting wheel and axle assemblies which increases productivity by permitting more flexible transit scheduling.

It is another object of the present invention to provide an apparatus for transporting wheel and axle assemblies which eliminates the necessity for the use of a transport train and the personnel required to operate such a train.

It is another object of the present invention to provide a method and apparatus for transporting wheel and axle assemblies which utilizes trucks carrying wheel and axle assembly receiving racks which facilitates loading and substantially reduces the danger of wheel and axle assemblies becoming dislodged during transport.

It is another object of the present invention to provide a method and apparatus for transporting wheel and axle assemblies which requires only a single driver to operate.

It is another object of the present invention to provide method and apparatus for transporting wheel and axle assemblies wherein three specially equipped trucks are required in order to complete the route.

It is another object of the present invention to provide method and apparatus for transporting wheel and axle assemblies which results in reduced labor costs, as well as reduced equipment costs.

In accordance with one aspect of the present invention, a rack is provided for transporting wheel and axle assemblies on the flatbed of a vehicle. The assemblies are of the type where each wheel includes an outwardly extending flange. The rack comprises first and second substantially parallel elongated parts and means for fastening the parts to the vehicle at locations spaced apart a distance sufficient to receive the flanges therebetween. Each of the parts comprises a base and first and second substantially coplanar upstanding elements mounted on and extending from the base. The elements comprise surfaces, contoured in accordance with the curve of the wheel, which cooperate to form a wheel receiving means.

In addition, each of the parts preferably comprises a rigidity enhancing member. The rigidity enhancing member extends between the base and one of the elements, in a plane substantially perpendicular to the plane of the elements.

The rigidity enhancing member preferably has a substantially triangular shape. The base comprises a portion to which the member is mounted. The base portion to which the member is mounted is located adjacent the portion of the base to which the elements are mounted.

The elements are spaced along and cooperate with the base to form a substantially semicircular wheel receiving recess. The wheel receiving recess prevents the wheels from moving forward or backwards. Locating the parts such that the flanges of the wheels are situated therebetween prevents lateral movement of the assembly.

In accordance with another aspect of the present invention, a rack for transporting wheel and axle assemblies on a flatbed vehicle is provided. The assemblies are of the type having flanged wheels. The rack comprises first and second parts and means for fastening the parts on the vehicle at locations spaced apart a distance sufficient to receive the flanges therebetween. Each of the parts comprises a base, a wheel receiving portion mounted on and extending from the base, and a rigidity enhancing member extending from the base to the portion, in a plane substantially perpendicular to the plane of the portion.

A second wheel receiving portion is preferably included. The rigidity enhancing member extends from the base to a point where the wheel receiving portions abut.

Each of the wheel receiving portions comprises first and second upstanding concave elements mounted on and spaced along the base. The elements and the base cooperate to form a substantially semicircular wheel receiving recess.

In accordance with another aspect of the present invention, a method for transporting wheel and axle assemblies for repair is provided. The wheel and axle assemblies are transported between first and second remote locations. The method employs three trailers, each equipped with wheel and axle receiving racks.

Prior to the beginning of the route, a first trailer is situated at a first location having the capability to remove and reinstall subway car wheel and axle assemblies and to load and unload the assemblies from the specially equipped trailers. This trailer has been previously loaded with assemblies to be repaired. A second trailer is situated at a second location where wheel and axle assemblies are removed from trailers, repaired, and reloaded onto the trailers. This trailer has been previously loaded with repaired assemblies. A third unloaded trailer is situated at the trailer yard.

The driver arrives for work at the yard. He picks up the third trailer, which is driven from the yard to the first location, where it will be left to be loaded with assemblies removed from subway cars. The driver picks up the first trailer, which is already loaded with assemblies to be repaired, and drives it from the first location to the second location, where the assemblies are unloaded for repair. The driver then picks up the second trailer, already loaded with repaired assemblies, and drives it from the second location back to the first location, where the repaired assemblies are removed. The driver then drives the unloaded second trailer back to the yard.

This method of transport eliminates delays caused by restrictive work train transit scheduling and increases productivity because workers at both the removal and reinstallation location and the repair location can work continuously. The overall time interval between removal of the assemblies for the passenger train and reinstallation thereof is reduced, resulting in increased efficiency of the system. The necessity for a diesel engine, a flatbed railroad car, and at least one individual are eliminated. In addition, the specially designed racks facilitate loading and unloading and reduce the danger of assemblies becoming dislodged during loading or transit. The result is an inexpensive and efficient method of transportation of wheel and axle assemblies for repair which not only reduces labor and equipment costs, but also enhances safety.

To these and to such other objects which may hereinafter appear, the present invention relates to method and apparatus for transporting wheel and axle assemblies for repair, as described in detail in the following specification and recited in the annexed claims, taken together with the accompanying drawings, wherein like numerals refer to like parts, and in which:

FIG. 1 is a schematic representation illustrating the method of the present invention for the transporting wheel and axle assemblies;

FIG. 2 is a plan view showing the top of a flatbed trailer and the apparatus of the present invention for transporting wheel and axle assemblies;

FIG. 3 is a side view of the invention shown in FIG. 2; and

FIG. 4 is a front view of the invention shown in FIG. 2, as seen along line 4—4 thereof.

As seen in FIGS. 2, 3, and 4, the present invention, in part, relates to apparatus for transporting wheel and axle assemblies of railroad or subway passenger cars which includes wheel and axle assembly receiving racks designed to be mounted on the flatbed of a vehicle such as a tractor trailer truck or railroad car. The bed of the vehicle comprises a substantially planar surface 10 upon which the rack for transporting railroad car wheel and axle assemblies is mounted. The wheel and axle assemblies comprise first and second spaced wheels, 12, 14, respectively, each having an outwardly extending flange near the interior edge thereof. Wheels 12 and 14 are mounted on an axle 16. Such wheel and axle assemblies are commonly used on the undercarriage of railroad or subway passenger cars.

Inner base members 18a and 20a are spaced apart by cross members 19 a distance approximately equal to the distance between the exterior surfaces of the flanges on wheels 12 and 14. Accordingly, when a wheel and axle assembly is received within aligned wheel receiving recesses, the flanges of each wheel will overlap the interior portion of the adjacent element 30, and the flanges of the wheels will be situated between the spaced parts. Because of this, a properly mounted wheel and axle assembly cannot shift laterally with respect to the rack. Rigidity enhancing members 32, because of their position and shape, prevent elements 30 from flexing or bending in a lateral direction, such that the wheel and axle assemblies are securely retained.

At 40 ft. flatbed vehicle can carry a rack designed to hold approximately 12 wheel and axle assemblies. For each part, a rigidity enhancing member is provided between each pair of wheel receiving recesses at a position proximate to the point where the adjacent upstanding elements 30 abut. In this manner, each part is structurally reinforced at a number of spaced locations along its length.

If required, each assembly may be secured to the rack during transportation. This may be achieved by encircling a portion of the part and the assembly by a chain or the like.

The method of the present invention is best understood with reference to FIG. 1. FIG. 1 depicts a situation where three flatbed trailer trucks, each equipped with the specially designed railroad car wheel and axle assembly receiving racks described above, are utilized to complete a route. The route commences at a vehicle parking yard 50. At a second location 52, remote from yard 50, is situated a facility for removing wheel and axle assemblies from the undercarriage of subway passenger cars and for reinstalling same. An another facility 54, remote from yard 50 and location 52, is located a repair shop containing machinery such as wheel truing machines for the repair of the wheels. The method requires only a single driver.

Before the driver commences the route, an unloaded vehicle is situated at yard 50. One of the vehicles is also situated at location 52 and has previously been loaded with wheel and axle assemblies removed from subway passenger cars, which are to be repaired. At location 54 is located a third truck, previously loaded with repaired wheel and axle assemblies, ready to be reinstalled.

At the beginning of the route, the driver comes to yard 50 and picks up the unloaded truck 56, previously situated at that location. He drives the unloaded truck 56 to location 52 where he leaves truck 56 such that wheel and axle assemblies, as they are removed from subway passenger cars at location 52, can be loaded thereon. The driver takes the loaded truck 58, previously loaded with wheel and axle assemblies to be repaired, and drives same from location 52 to location 54, where truck 58 is dropped off to be unloaded such that the wheel and axle assemblies thereon can be repaired. At this point, the driver picks up truck 60, which has been previously loaded at location 54 with repaired wheel and axle assemblies, and transports same back to location 52 where the repaired wheel and axle assemblies are removed from truck 60 and reinstalled on the subway passenger cars. After the wheel and axle assemblies have been removed from truck 60, the driver drives truck 60 back to yard 50 to complete the route.

During the route, truck 56 is situated at location 52 so that wheel and axle assemblies can be loaded thereon. In addition, truck 58 is situated at location 54 such that the wheel and axle assemblies transported thereby can be removed, repaired, and reloaded. Accordingly, personnel at locations 52 and 54 can work virtually continuously, without delay caused by waiting for wheel and axle assemblies to be transported.

It will now be appreciated that the method of the present invention reduces delays due to restrictions in work train transport schedules and increases productivity by permitting more flexible scheduling. It also eliminates the necessity for the use of a diesel engine, flatbed railroad car, and at least one individual. Moreover, the assemblies are transported in a safe manner, due to the unique structure of the racks which are situated on the vehicles. Each assembly is held by the rack in a manner which prevents forward and backward, as well as lateral, movement and, in addition, permits the wheel and axle assemblies to be quickly removed or loaded onto the rack by a conventional crane.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims:

I claim:

1. A rack for transporting railroad car wheel and axle assemblies on the flatbed of a vehicle, the assemblies being of the type where each wheel includes an outwardly extending flange, the rack comprising first and second substantially parallel elongated parts, means extending in a first direction generally parallel to the axles of the assemblies for spacing said parts a distance sufficient to receive the flanges therebetween, so as to prevent relative movement between the assemblies and said parts in said first direction, means for fastening said spacing means to the vehicle bed, each of said parts comprising first and second spaced members, each of said members comprising a base, a rigidity enhancing member mounted to said base, and extending in said first direction, and an upstanding element mounted on and extending from said rigidity enhancing member, in a second direction substantially perpendicular to said first direction, said element comprising a surface contoured in accordance with the curve of the wheel, said elements on adjacent members being oppositely oriented along said second direction and cooperating to form a wheel receiving recess therebetween so as to prevent relative movement between the assemblies and said elements in said second direction.

2. The rack of claim 1, wherein said member has a substantially triangular shape.

3. The rack of claim 1, wherein said base comprises an outwardly extending portion to which said member is mounted.

4. The rack of claim 3, wherein said outwardly extending base portion is located adjacent the portion of the base to which said elements are mounted.

* * * * *